(12) United States Patent
Smithson et al.

(10) Patent No.: US 6,322,017 B1
(45) Date of Patent: Nov. 27, 2001

(54) SEAT BELT RETRACTOR

(75) Inventors: Alan George Smithson; David Blackadder, both of Carlisle; Joseph Patrick Harte, Maryport, all of (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/542,325

(22) Filed: Apr. 4, 2000

(30) Foreign Application Priority Data

Sep. 17, 1999 (GB) .................................................. 9922109

(51) Int. Cl.[7] .................................................. B60R 22/28
(52) U.S. Cl. .................................................. 242/379.1
(58) Field of Search .................. 242/379.1; 280/805, 280/806; 297/470, 471, 472, 478

(56) References Cited

U.S. PATENT DOCUMENTS 3,970,265   7/1976   Kopke et al. ...................... 242/379.1
4,323,205   4/1982   Tsuge et al. ...................... 242/379.1

FOREIGN PATENT DOCUMENTS 0297537   1/1989   (EP) .
2347899   9/2000   (GB) .

*Primary Examiner*—John M. Jillions
(74) *Attorney, Agent, or Firm*—Lonnie Drayer

(57) ABSTRACT

A seat belt retractor has a spool that is rotatable about an axis for receiving seat belt webbing. A locking means prevents rotation of the spool during a crash to prevent webbing payout. A load limiting means has a torsion bar extending through the spool and connected in a force path between the locking means and the webbing. One end of the torsion bar is attached to the spool, and the opposite end of the torsion bar is attached to a toothed wheel, wherein said opposite end of the torsion bar is connected to the toothed wheel in an axially adjustable manner.

4 Claims, 4 Drawing Sheets

SEAT BELT RETRACTOR

FIELD OF INVENTION

The present invention relates to a safety restraint for use in a vehicle and particularly to a retractor for a seat belt.

BACKGROUND OF THE INVENTION

Modern seat belts comprise a length of webbing arranged to pass diagonally across the torso, and generally horizontally across the hip region of the vehicle occupant (so-called lap portion of the belt). This is known as a three-point belt system. One end of the belt webbing is firmly attached to a structural part of the vehicle such as the floor, and the other end is attached to the spool of a retractor which itself is firmly attached to a structural part of the vehicle, usually the side B-pillar. Between the retractor and the fixed point, a fastening element such as a metal tongue is fixed to the belt with which it can be fastened into a buckle which itself is attached to fixed part of the vehicle on the other side of the occupant seat to the retractor.

SUMMARY OF THE INVENTION

The seat belt retractor has a clock spring, which automatically keeps any slack in the belt wound onto the spool and thus keeps a resilient tension in the belt. The clock spring allows payout of webbing under the influence of relatively gentle forwardly directed inertia of the vehicle occupant, for example to allow for normal movement of the vehicle occupant such as occurs when he reaches forward to activate car controls, or access glove compartments or door pockets.

In the event of a crash, the sudden high forward momentum of the vehicle occupant activates a crash sensor which locks the spool against rotation and restricts forward motion of the vehicle occupant to prevent him colliding with and being injured by internal fixtures of the vehicle such as the steering wheel, dashboard or windshield.

However in high velocity crashes, the sudden locking of the seat belt can itself cause injury to the vehicle occupant due to the sudden impact of the torso with the belt webbing.

In recent years, load-limiting effects have been introduced into seat belt systems so as to allow a limited and controlled forward motion of the vehicle occupant after the retractor has locked. This decreases the forces exerted by the belt on the vehicle occupant's torso.

Load limiting proposals are arrangements familiar to those skilled in the art, including arrangements whereby deformable torsion bars are placed within the retractor spool in the force path between the spool locking mechanism and the belt webbing.

However, it has been found that as it twists, the torsion bar lengthens. Thus the locking teeth engaging the spool can move away from the spool causing the teeth to disengage from the lockbar and thus causing the retractor to unlock at high loads. Evidently this is extremely dangerous.

The present invention provides an improved load limiting arrangement for seat belt retractors using torsion bars.

According to the present invention, there is provided a retractor for a seat belt comprising a spool, rotatable about its axis, for receiving seat belt webbing, a locking means for preventing rotation of the spool during a crash to prevent webbing pay-out, and load limiting means comprising a torsion bar extending through the spool and connected in the force path between the locking means and the webbing, one end of the torsion bar being attached to the spool, and the opposite end of the torsion bar being attached to a toothed wheel, wherein said opposite end of the torsion bar is connected to the toothed wheel in an axially adjustable manner.

According to a preferred embodiment, the torsion bar and the wheel are connected by cooperating members in such a way that axial expansion of the bar is automatically compensated. The cooperating member may be teeth and splines.

The splines are preferably spiral formed and may be of screw threaded form or helical.

Preferably the angle of the helix is selected to compensate for friction between the bar and the spool splines.

BRIEF DESCRIPTION OF THE DRAWINGS

For a better understanding of the present invention, and to show how the same may be carried into effect, reference will now be made to the accompanying drawings, in which.

BRIEF DESCRIPTION OF THE INVENTION

Figure 1:
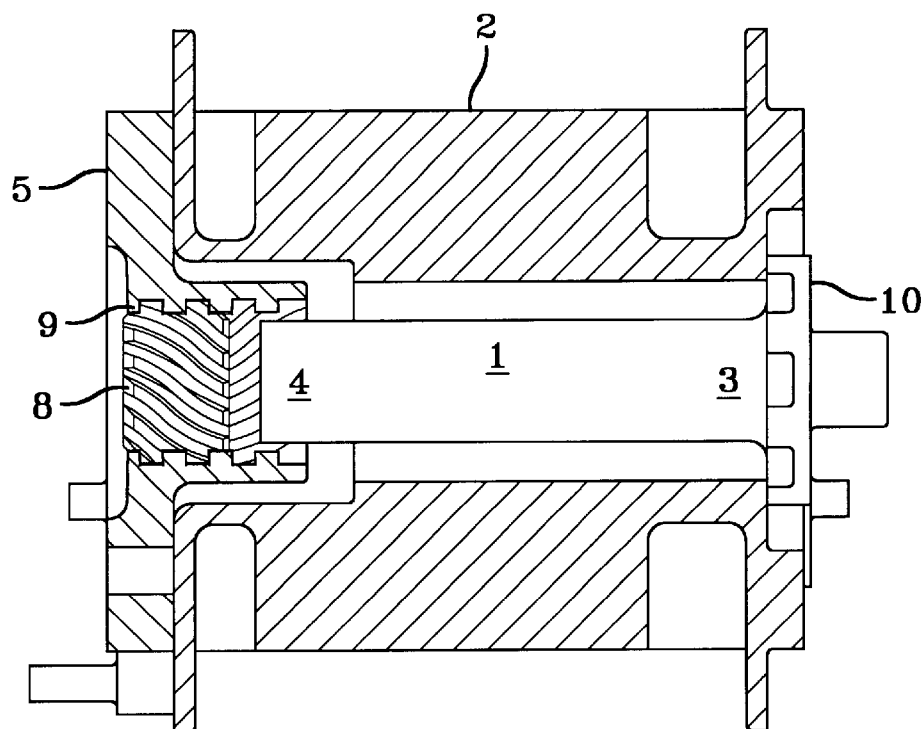
FIG. 1 is a cross-sectional view of a retractor according to a first embodiment of the present invention.
Figure 2:
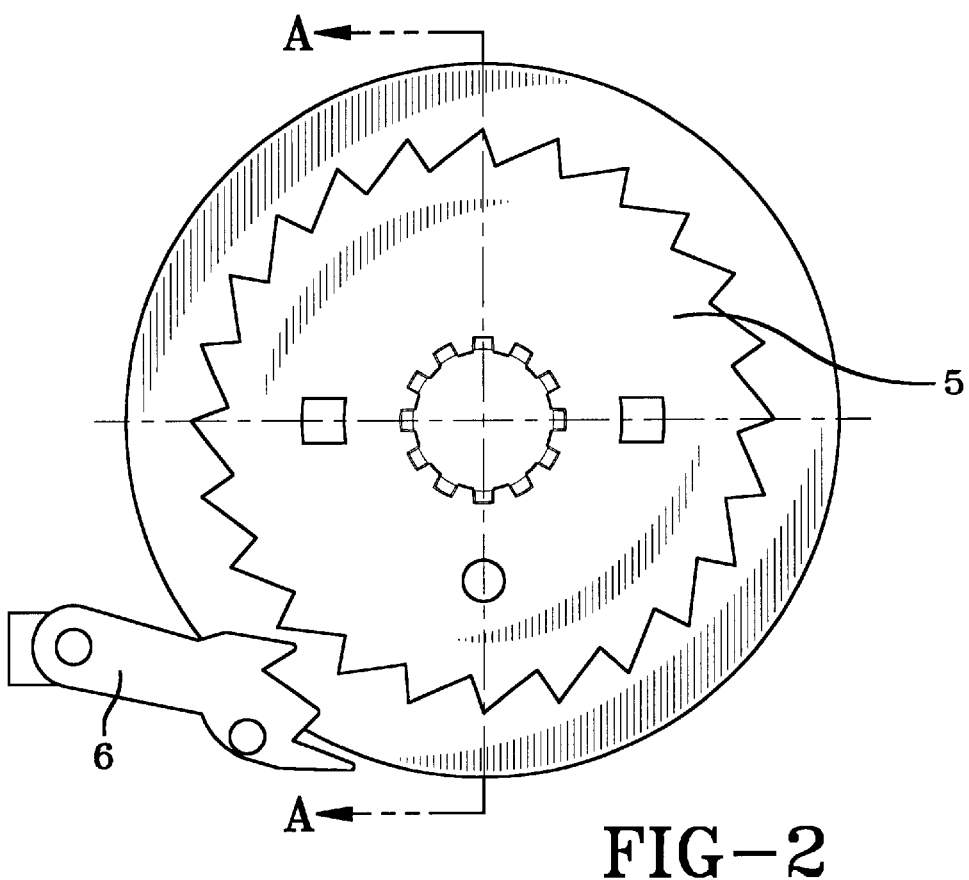
FIG. 2 is a side view of the retractor of FIG. 1.
Figure 3:
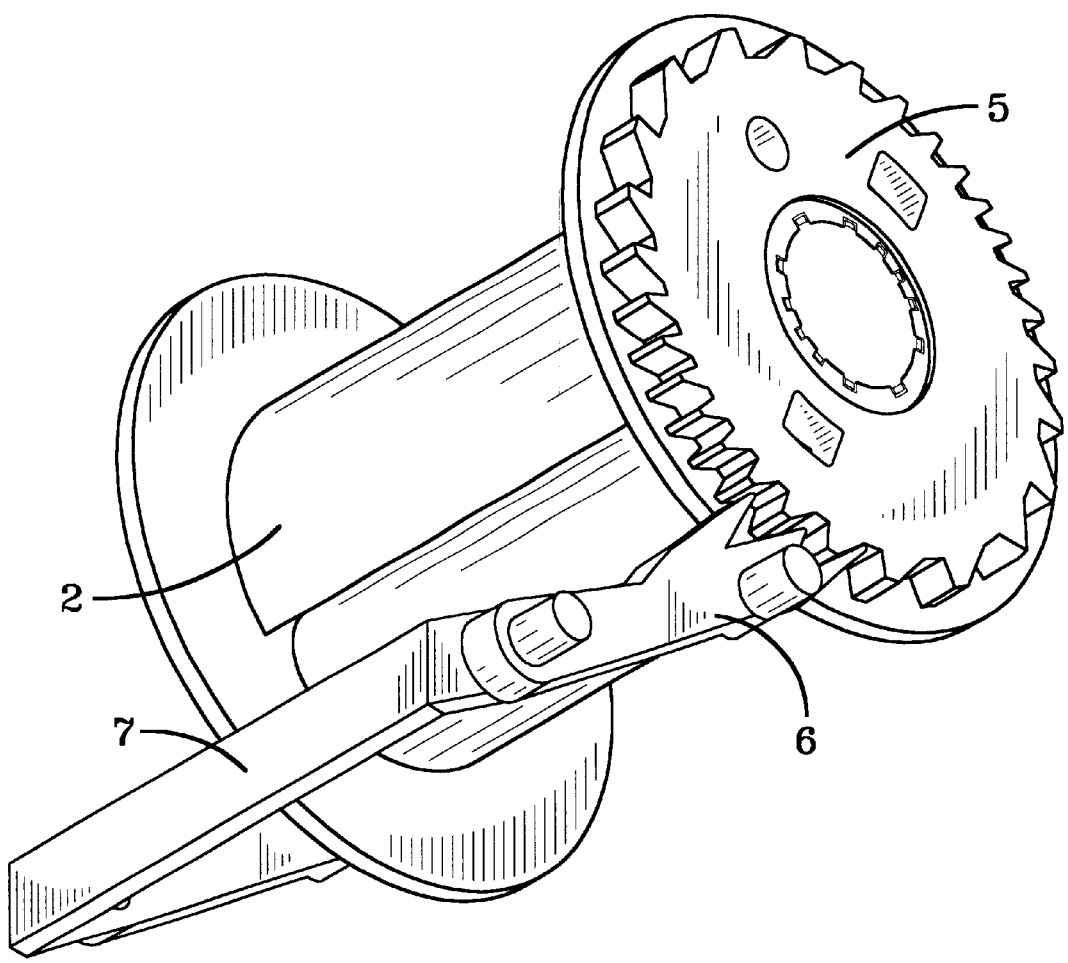
FIG. 3 is a perspective bottom view of a spool for a retractor according to FIG. 1.

In FIGS. 1 to 3, a torsion bar is shown at 1 in the form of an elongate rod passing through the hollow center of a retractor spool 2. A first end 3 of the torsion bar 1 is connected to the spool and a second opposite end 4 is connected to a ratchet wheel 5. A locking pawl 6 is attached to lockbar 7 (FIGS. 2 and 3) and engages a ratchet wheel 5 when a sensor indicates that a crash is occurring or is imminent (usually by sensing sudden deceleration of the vehicle). This locks the second end 4 of the torsion bar 1. The forward momentum of the restrained vehicle occupant pulls on the webbing and applies a rotational torque to the spool and thus to the first end 3 of the bar 1. The load on the vehicle occupant rises until the torque is sufficient to twist the torsion bar allowing some webbing payout: for up to 5 turns before the locking torque of the ratchet wheel is transferred to the spool itself, fully restraining the occupant.

The first end 3 of the torsion bar 1 is attached to the spool 2 by cooperating formations on the spool end face and on the coupling surface of the torsion bar. A ring of peripheral holes are provided in the corresponding end face of the spool 2 and cooperating, radially inwardly projecting teeth are formed on the facing surface of a radially extending plate 10 at the first end 3 of the torsion bar 1. Suitable locking formations are shown in GB 2347899 A. However, other conventional means of connecting the torsion bar 1 to the spool may be used.

At the second end 4 of the torsion bar 1, a series of peripheral splines 8 are formed radially, setting proud of the surface of the torsion bar. These splines 8 engage with locking teeth 9 extending radially inwardly in an axially oriented cavity in the ratchet wheel 5. The splines 8 are formed in either a spiral or a helix (FIG. 1) or a screw thread (FIG. 4).

With this arrangement, as the torsion bar 1 lengthens, the splines 8 absorb the change in the length of the bar 1 by screwing themselves into the locking teeth 9.

In the embodiment with helical splines in FIG. 1, the splines 8 effectively distort as they screw into the teeth and the force of the main part of the torsion bar lengthening as it twists, is effectively absorbed by the outer end portion of the bar being compressed as it is screwed into the teeth.

Figure 4:
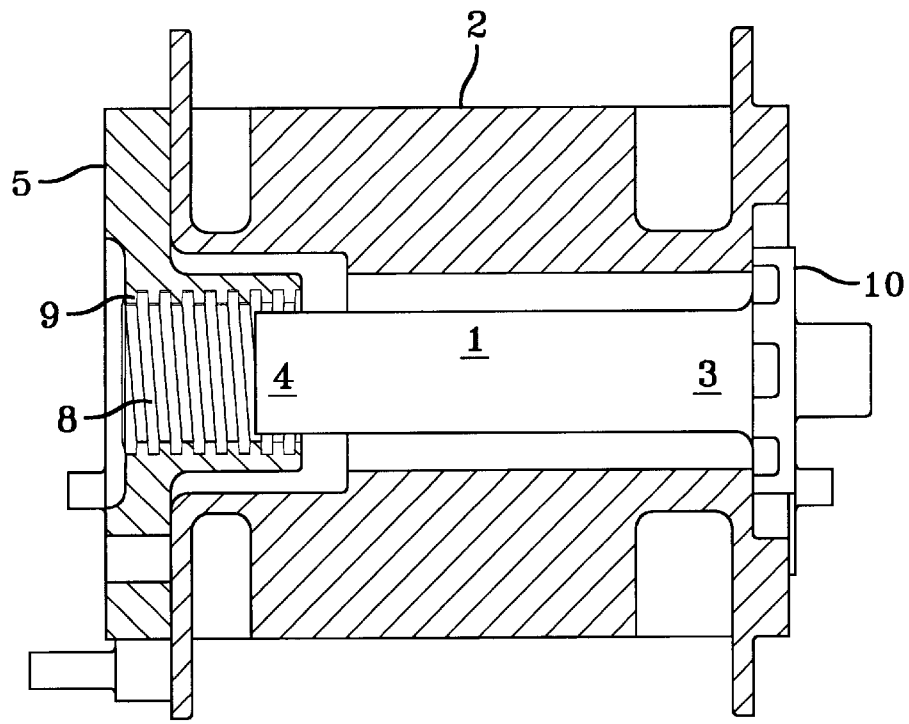
FIG. 4 is a cross-sectional view of a retractor according to a second embodiment of the present invention.
Figure 5:
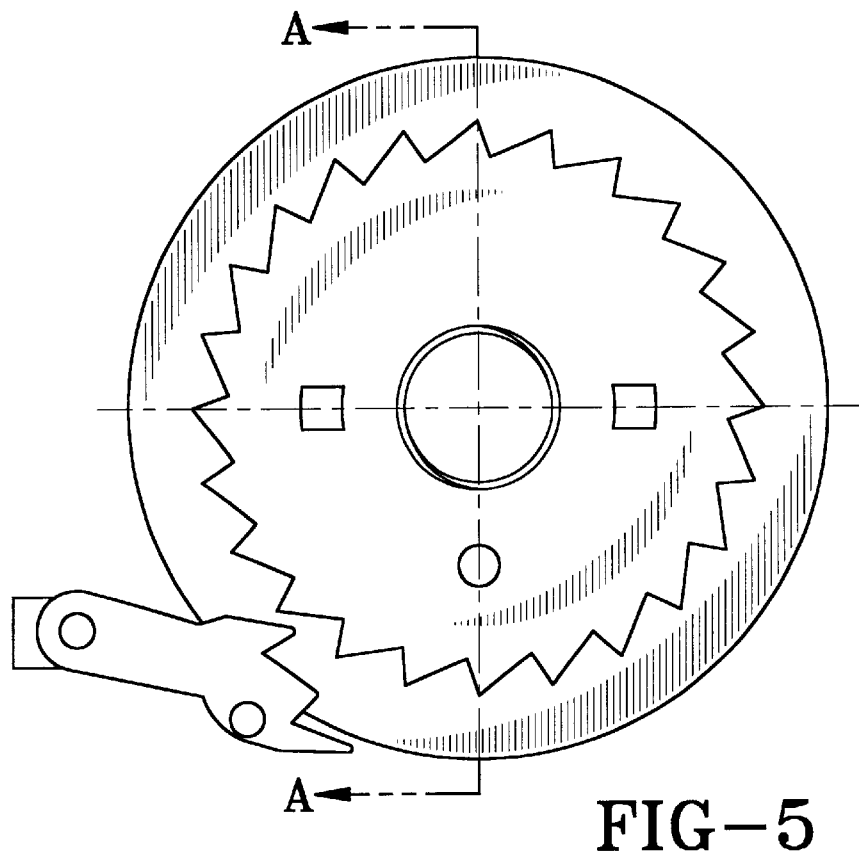
FIG. 5 is an end view of the retractor of FIG. 4.
Figure 6:
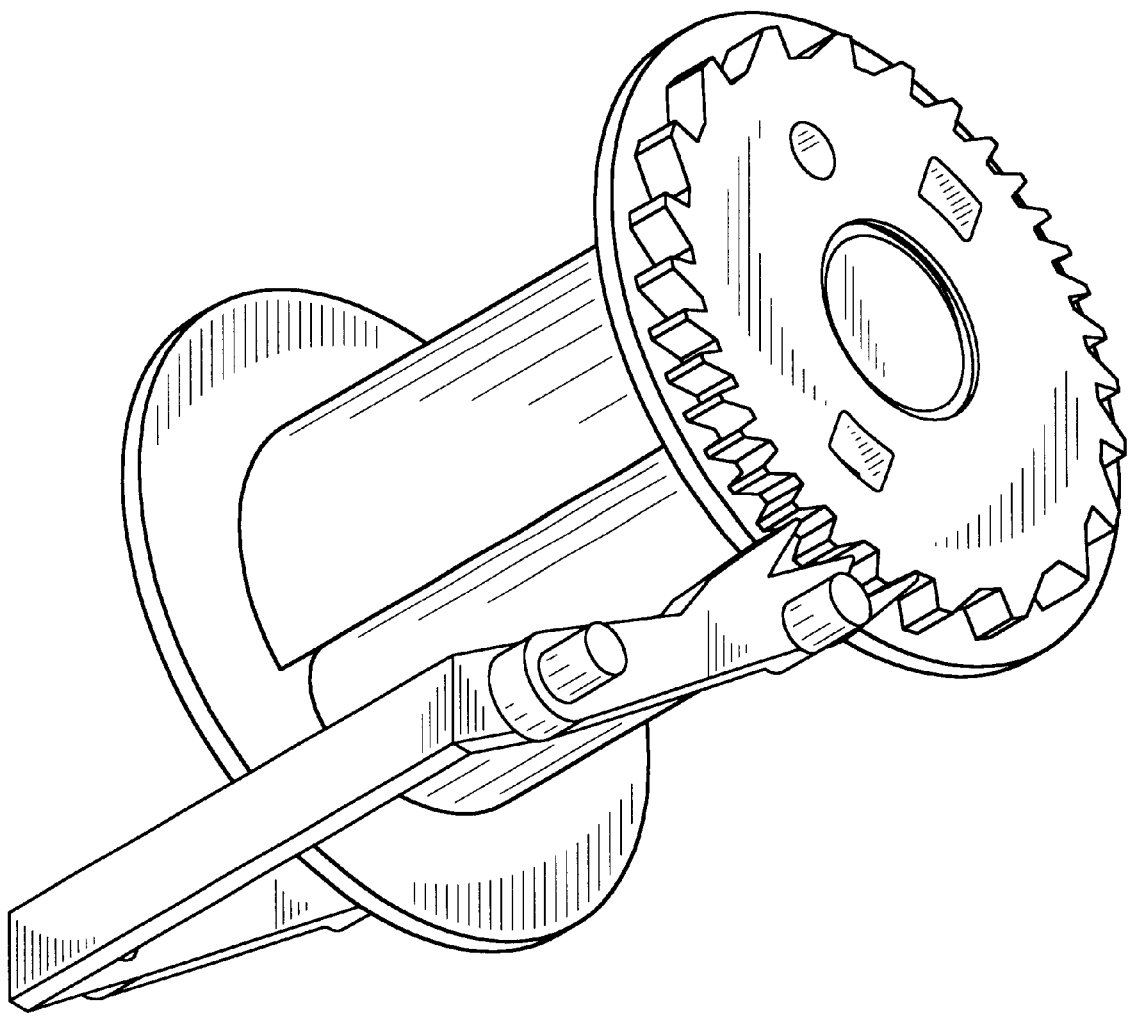
FIG. 6 is a perspective view, taken from the bottom, of a spool for the retractor of FIG. 4.

In the embodiment shown in FIG. 4, where the splines 8 take a screw threaded form, the center section of the torsion bar effectively elongates. The pitch of the thread controls the ratio of twisting of the torsion bar 1 to its elongation. Thus, the change in the length of the torsion bar 1 can be used to control the load limiting effect on a particular spool.

In the first embodiment of FIG. 1, the angle of the helix can be chosen or selected to compensate for friction between the torsion bar and the splines. For example, a lower helix angle is suitable for high friction, in general:

$$1/\tan \theta > \mu$$

where $\theta$ is the helix angle of the thread, $\mu$ is the co-efficient of friction between the bar and the spool splines.

This relationship is derived from simple resolution of the friction force $T_F$ into the component in the sliding direction $S_F = T_F \cos \theta$ and the perpendicular component $P_F = T_F \sin \theta$. For the threads to slide $S_F > \mu P_F$ $$\therefore T_F \cos \theta > \mu T_F \sin \theta$$

$$\therefore 1/\tan \theta > \mu$$

It is understood that the invention is not limited to the particular construction and arrangement of parts herein illustrated and described, but embraces such modified forms thereof as come within the scope of the following claims.

We claim:

1. A seat belt retractor comprising a spool rotatable about an axis for receiving seat belt webbing, a locking means for preventing rotation of the spool during a crash to prevent webbing pay-out, and load limiting means comprising a torsion bar extending through the spool and connected in a force path between the locking means and the webbing, an end of the torsion bar being attached to the spool, and an opposite end of the torsion bar being attached to a toothed wheel by cooperating teeth and splines in such a way that axial expansion of the torsion bar is automatically compensated, the splines being spiral formed, said opposite end of the torsion bar being connected to the toothed wheel in an axially adjustable manner.

2. A seat belt retractor comprising a spool rotatable about an axis for receiving seat belt webbing, a locking means for preventing rotation of the spool during a crash to prevent webbing pay-out, and load limiting means comprising a torsion bar extending through the spool and connected in a force path between the locking means and the webbing, an end of the torsion bar being attached to the spool, and an opposite end of the torsion bar being attached to a toothed wheel by cooperating teeth and splines in such a way that axial expansion of the torsion bar is automatically compensated, the splines having a screw threaded form, said opposite end of the torsion bar being connected to the toothed wheel in an axially adjustable manner.

3. A seat belt retractor comprising a spool rotatable about an axis for receiving seat belt webbing, a locking means for preventing rotation of the spool during a crash to prevent webbing pay-out, and load limiting means comprising a torsion bar extending through the spool and connected in a force path between the locking means and the webbing, an end of the torsion bar being attached to the spool, and an opposite end of the torsion bar being attached to a toothed wheel by cooperating teeth and splines in such a way that axial expansion of the torsion bar is automatically compensated, the splines being helical, said opposite end of the torsion bar being connected to the toothed wheel in an axially adjustable manner.

4. The seat belt retractor of claim 3 wherein the angle of the helix compensates for friction between the torsion bar and the spool splines.

* * * * *